(12) United States Patent
Kawai et al.

(10) Patent No.: US 10,818,972 B2
(45) Date of Patent: Oct. 27, 2020

(54) ELECTROLYTE SOLUTION FOR LITHIUM SECONDARY BATTERY

(71) Applicant: TOYOTA JIDOSHA KABUSHIKI KAISHA, Toyota-shi, Aichi-ken (JP)

(72) Inventors: Toshiyuki Kawai, Nagoya (JP); Hiroto Asano, Nisshin (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 215 days.

(21) Appl. No.: 16/163,683

(22) Filed: Oct. 18, 2018

(65) Prior Publication Data

US 2019/0123387 A1 Apr. 25, 2019

(30) Foreign Application Priority Data

Oct. 19, 2017 (JP) .................. 2017-202906

(51) Int. Cl.
*H01M 6/16* (2006.01)
*H01M 10/0567* (2010.01)
*H01M 10/0525* (2010.01)
*H01M 10/0568* (2010.01)
*H01M 10/0569* (2010.01)

(52) U.S. Cl.
CPC ... *H01M 10/0567* (2013.01); *H01M 10/0525* (2013.01); *H01M 10/0568* (2013.01); *H01M 10/0569* (2013.01); *H01M 2300/0034* (2013.01)

(58) Field of Classification Search
CPC ......... H01M 10/0567; H01M 10/0525; H01M 10/052; H01M 10/0568; H01M 10/0569; H01M 2300/0034
See application file for complete search history.

(56) References Cited

U.S. PATENT DOCUMENTS 9,130,244 B2 * 9/2015 Abe ................... H01M 10/052
2007/0148540 A1 6/2007 Chiga et al.
(Continued)

FOREIGN PATENT DOCUMENTS

JP 2007-087883 A 4/2007

*Primary Examiner* — Raymond Alejandro
(74) *Attorney, Agent, or Firm* — Sughrue Mion, PLLC

(57) ABSTRACT

Provided is an electrolyte solution for a lithium secondary battery, which can lower the resistance of a lithium secondary battery and impart the lithium secondary battery with high cycle characteristics. The electrolyte solution for a lithium secondary battery disclosed here includes an electrolyte salt consisting essentially of a lithium imide salt, a solvent containing methyl difluoroacetate, and an unsaturated carboxylic acid anhydride compound represented by formula (1) below as an additive (in the formula, $R_1$ and $R_2$ each independently denote a hydrogen atom, a fluorine atom, or an alkyl group that may be fluorine-substituted, or $R_1$ and $R_2$ bond to each other to form a ring structure).

[C1]

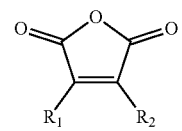

(1)

2 Claims, 2 Drawing Sheets

(56) References Cited

U.S. PATENT DOCUMENTS

| | | | | |
|---|---|---|---|---|
| 2012/0141869 A1* | 6/2012 | Takahata | ............ | H01M 10/052 429/188 |
| 2014/0377635 A1* | 12/2014 | Matsumoto | ........... | H01M 4/133 429/163 |
| 2016/0126592 A1* | 5/2016 | Saito | ................ | H01M 10/0567 429/338 |

* cited by examiner

ELECTROLYTE SOLUTION FOR LITHIUM SECONDARY BATTERY

BACKGROUND OF THE INVENTION

1. Field of the Invention

The present teaching relates to an electrolyte solution for a lithium secondary battery. The present application claims priority on the basis of Japanese Patent Application No. 2017-202906 filed on 19 Oct. 2017, and the entire contents of which are incorporated herein by reference.

2. Description of the Related Art

In recent years, lithium secondary batteries have been advantageously used as portable power sources for personal computers, mobile terminals, and the like, and as driving power sources for vehicles such as electric vehicles (EV), hybrid vehicles (HV) and plug-in hybrid vehicles (PHV).

As lithium secondary batteries have become more widespread, there have been demands for higher performance. Japanese Patent Application Publication No. 2007-087883 discloses use of an electrolyte solution that contains 10 vol % or more, relative to the overall amount of solvent, of methyl difluoroacetate, and $LiPF_6$ and a lithium imide salt as solutes in a lithium secondary battery in order to improve charging/discharging characteristics of the lithium secondary battery. In addition, Japanese Patent Application Publication No. 2007-087883 indicates that initial efficiency is improved by adding vinylene carbonate as an additive to the electrolyte solution.

SUMMARY OF THE INVENTION

Meanwhile, because there have been demands for higher input-output characteristics of lithium secondary batteries, there have been demands to further lower resistance. In addition, there have been demands for higher cycle characteristics of lithium secondary batteries. However, the prior art disclosed in Japanese Patent Application Publication No. 2007-087883 cannot adequately address these requirements relating to resistance and cycle characteristics.

Therefore, the purpose of the present teaching is to provide an electrolyte solution for a lithium secondary battery, which can lower the resistance of a lithium secondary battery and impart the lithium secondary battery with high cycle characteristics.

The electrolyte solution for a lithium secondary battery disclosed here includes an electrolyte salt consisting essentially of a lithium imide salt, a solvent containing methyl difluoroacetate, and an unsaturated carboxylic acid anhydride compound represented by formula (1) below as an additive.

[C1]

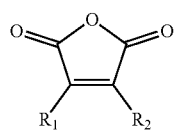

(1)

In formula (1), $R_1$ and $R_2$ each independently denote a hydrogen atom, a fluorine atom, or an alkyl group that may be fluorine-substituted, or $R_1$ and $R_2$ bond to each other to form a ring structure.

By using an electrolyte solution having such a constitution in a lithium secondary battery, it is possible to lower the resistance and increase cycle characteristics of the lithium secondary battery. This is assumed to be because use of an electrolyte solution having such a constitution enables a coating film to be sufficiently formed on a negative electrode of a lithium secondary battery and enables side reactions to be suppressed.

In a desired aspect of the electrolyte solution for a lithium secondary battery disclosed here, the electrolyte salt has a concentration of no less than 1.5 mol/L and no more than 2.5 mol/L.

By using an electrolyte solution having such a constitution in a lithium secondary battery, it is possible to further lower the resistance of the lithium secondary battery.

DESCRIPTION OF THE PREFERRED EMBODIMENTS

Figure 1:
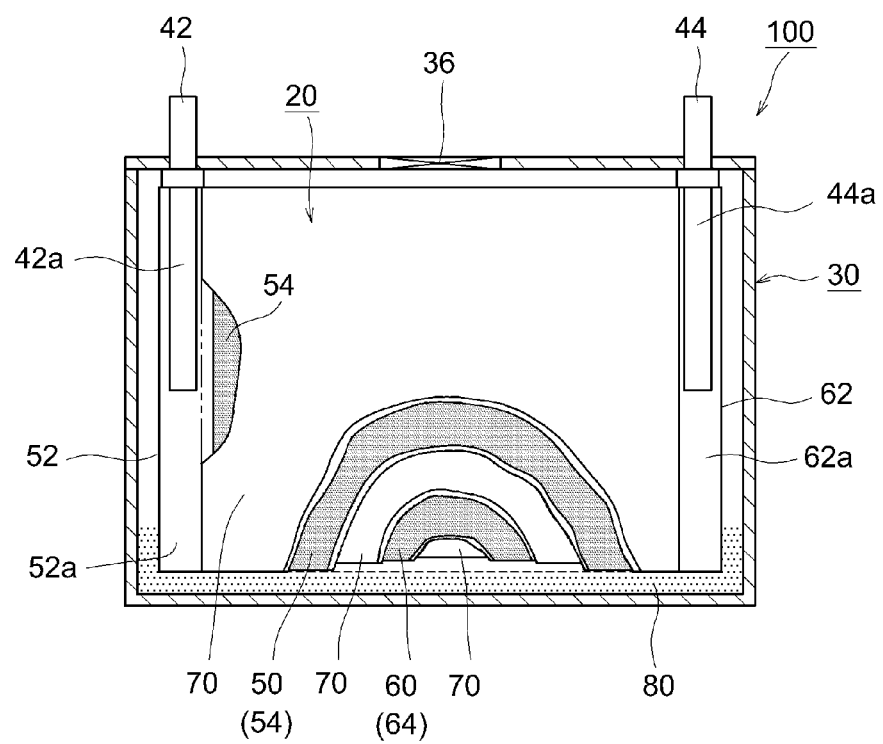
FIG. 1 is a cross-sectional view that schematically illustrates the internal structure of a lithium secondary battery according to one embodiment of the present teaching.

Embodiments of the present teaching will now be explained. Incidentally, the matters other than those specifically mentioned in the present specification and necessary for the implementation of the present teaching (for example, ordinary features and production processes of the electrolyte solution for a lithium secondary that do not characterize the present teaching) can be understood as design matters to be addressed by a person skilled in the art on the basis of the related art in the pertinent field. The present teaching can be carried out on the basis of the matters disclosed in the present specification and common general technical knowledge in this technical field.

It should be noted that the term "secondary battery" in the present specification means electricity storage devices in general that can be repeatedly charged and discharged, and is a term that encompasses so-called storage batteries and electricity storage elements such as electrical double layer capacitors.

In addition, the term "lithium secondary battery" in the present specification means a secondary battery in which lithium ions are used as charge carriers and charging and discharging are effected by means of charge transfer involving lithium ions between positive and negative electrodes.

The electrolyte solution for a lithium secondary battery according to the present embodiment includes an electrolyte salt consisting essentially of a lithium imide salt, a solvent containing methyl difluoroacetate, and an unsaturated carboxylic acid anhydride compound represented by formula (1) below as an additive (hereinafter also referred to as "unsaturated carboxylic acid anhydride compound (1)").

[C2]

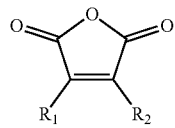

(1)

In formula (1), $R_1$ and $R_2$ each independently denote a hydrogen atom, a fluorine atom, or an alkyl group that may be fluorine-substituted, or $R_1$ and $R_2$ bond to each other to form a ring structure.

Examples of lithium imide salts able to be used as electrolyte salts include lithium bis(fluorosulfonyl)imide (LiFSI) and lithium bis(trifluoromethane)sulfonimide (LiTFSI), and lithium bis(fluorosulfonyl)imide is desirably used.

In the present specification, the statement "the electrolyte salt consists essentially of a lithium imide salt" means that "the electrolyte salt may contain salts that function as electrolytes other than the lithium imide salt, but incorporating such salts that function as electrolytes other than the lithium imide salt is limited to cases in which the basic characteristics and novel characteristics of the electrolyte salt are not substantially changed". Therefore, the electrolyte salt is substantially free from $LiPF_6$, which is a salt that functions as an electrolyte other than the lithium imide salt. The content of salts that function as electrolytes other than the lithium imide salt is desirably less than 4 mass %, more desirably 2 mass % or less, and most desirably 0 mass % (that is, it is desirable for the electrolyte salt to contain more than 96 mass % of the lithium imide salt, more desirable for the electrolyte salt to contain 98 mass % or more of the lithium imide salt, and most desirable for the electrolyte salt to consist only of the lithium imide salt).

The concentration of the electrolyte salt is not particularly limited as long as the advantageous effect of the present teaching can be achieved. From the perspective of adequately exhibiting the function of an electrolyte salt, the concentration of the electrolyte salt in the electrolyte solution is desirably no less than 0.5 mol/L and no more than 5 mol/L, and more desirably no less than 1.0 mol/L and no more than 2.5 mol/L. From the perspective of further lowering battery resistance, the concentration of the electrolyte salt is most desirably no less than 1.5 mol/L and no more than 2.5 mol/L.

Methyl difluoroacetate has a low molecular weight and is a solvent component that is effective for lowering battery resistance. In addition, methyl difluoroacetate has a flash point of not lower than 21° C., and therefore has the advantage of being unlikely to ignite.

The content of methyl difluoroacetate in the solvent is desirably 70 vol % or more. From the perspective of high low-temperature output, the content of methyl difluoroacetate in the solvent is more desirably 80 vol % or more, further desirably 90 vol % or more, and most desirably 100 vol %.

In formula (1), the number of carbon atoms in the alkyl groups that may be fluorine-substituted represented by $R_1$ and $R_2$ is desirably 1 to 3.

In cases where $R_1$ and $R_2$ bond to each other to form a ring structure, the ring structure may be an aromatic ring or aliphatic ring, examples of which include a cyclopentane ring and a cyclohexane ring.

It is desirable for both $R_1$ and $R_2$ to be hydrogen atoms. That is, unsaturated carboxylic acid anhydride compound (1) is desirably maleic anhydride (in which $R_1$ is H and $R_2$ is H) or citraconic anhydride (in which $R_1$ is H and $R_2$ is $CH_3$), and more desirably maleic anhydride.

The concentration of unsaturated carboxylic acid anhydride compound (1) is not particularly limited as long as the advantageous effect of the present teaching can be achieved. If the concentration of unsaturated carboxylic acid anhydride compound (1) is high, cycle characteristics are greatly improved, but the resistance lowering effect tends to be slight. However, if the concentration of unsaturated carboxylic acid anhydride compound (1) is low, resistance is dramatically lowered, but the cycle characteristics improvement effect tends to be slight. From the perspective of achieving a balance between cycle characteristics and battery resistance, the concentration of unsaturated carboxylic acid anhydride compound (1) in the electrolyte solution is desirably no less than 0.01 mass % and no more than 5 mass %, and more desirably no less than 0.3 mass % and no more than 3 mass %.

It should be noted that, the electrolyte solution for a lithium secondary battery according to the present embodiment may contain a variety of additives, for example gas generating agents such as biphenyl (BP) and cyclohexylbenzene (CHB); film-forming agents; dispersing agents; and thickening agents, as long as the advantageous effect of the present teaching is not significantly impaired.

The electrolyte solution for a lithium secondary battery according to the present embodiment can be used in lithium secondary batteries in accordance with publicly known methods. By using the electrolyte solution for a lithium secondary battery according to the present embodiment in a lithium secondary battery, it is possible to lower the resistance and increase the cycle characteristics of the lithium secondary battery.

The reason for this is thought to be as follows.

Using an ester solvent having a low molecular weight (a low viscosity) is effective for lowering the resistance of the electrolyte solution, and it is therefore thought that use of methyl difluoroacetate, which has a low molecular weight, is effective. As a result of research, however, the inventors of the present teaching found that by using a prior art electrolyte solution (see Japanese Patent Application Publication No. 2007-087883), which contains methyl difluoroacetate as a solvent and $LiPF_6$ and a lithium imide salt as solutes, problems occurred, such as the resistance and cycle characteristics of a lithium secondary battery being insufficient. This is thought to be because methyl difluoroacetate undergoes reductive decomposition due to exhibiting low reduction resistance and because the initial negative electrode reactive resistance increases as a result of side reactions between $LiPF_6$ and methyl difluoroacetate. In addition, use of vinylene carbonate as an additive has been proposed in the prior art, but it was found that in such cases also, resistance and cycle characteristics could not be adequately improved.

In the electrolyte solution for a lithium secondary battery according to the present embodiment, however, the electrolyte salt consists essentially of a lithium imide salt and thus is substantially free from $LiPF_6$. In addition, because the electrolyte salt consists essentially of a lithium imide salt and unsaturated carboxylic acid anhydride compound (1) is added (that is, because the lithium imide salt is combined with unsaturated carboxylic acid anhydride compound (1)), a coating film can be adequately formed on the negative electrode of a lithium secondary battery. Therefore, it is possible to suppress the side reactions such as a reductive decomposition of methyl difluoroacetate and a reaction between LiPF$_6$ and methyl difluoroacetate.

With reference to the drawings, an explanation will now be given of the outline of an example of the constitution of a lithium secondary battery that uses the electrolyte solution for a lithium secondary battery according to the present embodiment. In the drawings below, members/parts that perform the same action are denoted by the same symbols. In addition, the dimensional relationships (length, width, thickness and so on) in the drawings do not reflect actual dimensional relationships.

A lithium secondary battery 100 shown in FIG. 1 is a sealed battery constructed by housing a flat wound electrode body 20 and an electrolyte solution 80 in a flat square battery case (that is, an outer container) 30. The battery case 30 is provided with a positive electrode terminal 42 and negative electrode terminal 44 for external connections, and a thin safety valve 36, which is set so as to release an internal pressure when the internal pressure of the battery case 30 rises to a predetermined level or higher. In addition, the battery case 30 is provided with an injection hole (not shown) for injecting the electrolyte solution 80. The positive electrode terminal 42 is electrically connected to the positive electrode current collector sheet 42*a*. The negative electrode terminal 44 is electrically connected to the negative electrode current collector sheet 44*a*. A metallic material which is lightweight and exhibits good thermal conductivity, such as aluminum, can be used as the constituent material of the battery case 30.

Figure 2:
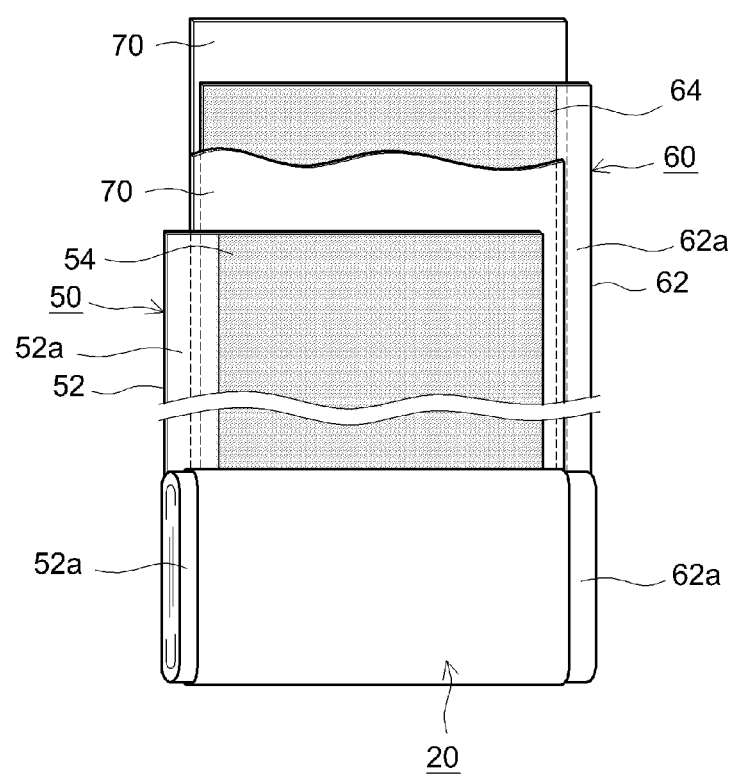
FIG. 2 is a schematic diagram that illustrates the constitution of a lithium secondary battery according to one embodiment of the present teaching.

As shown in FIGS. 1 and 2, the wound electrode body 20 has a structure obtained by laminating a positive electrode sheet 50 in which a positive electrode active material layer 54 is formed along the longitudinal direction on one side or both sides (here, both sides) of an elongated positive electrode current collector 52 and a negative electrode sheet 60 in which a negative electrode active material layer 64 is formed along the longitudinal direction on one side or both sides (here, both sides) of an elongated negative electrode collector 62, with two elongated separator sheets 70 being interposed therebetween, and winding the laminate in the longitudinal direction. A positive electrode active material layer non-formation portion 52*a* (that is, a portion where the positive electrode active material layer 54 is not formed and the positive electrode current collector 52 is exposed) and a negative electrode active material layer non-formation portion 62*a* (that is, a portion where the negative electrode active material layer 64 is not formed and the negative electrode current collector 62 is exposed), which are formed to protrude to the outside from both ends of the wound electrode body 20 in the winding axis direction (that is, a sheet width direction orthogonal to the longitudinal direction) are joined to a positive electrode current collector plate 42*a* and a negative electrode current collector plate 44*a*, respectively.

Sheets the same as or similar to those used in conventional lithium secondary batteries can be used without limitation as the positive electrode sheet 50 and negative electrode sheet 60. A typical aspect is shown below.

For example, an aluminum foil or the like can be used as the positive electrode current collector 52 that constitutes the positive electrode sheet 50. For example, a lithium-transition metal oxide (for example, LiNi$_{1/3}$Co$_{1/3}$Mn$_{1/3}$O$_2$, LiNiO$_2$, LiCoO$_2$, LiFeO$_2$, LiMn$_2$O$_4$, LiNi$_{0.5}$Mn$_{1.5}$O$_4$, or the like) or a lithium-transition metal phosphate compound (for example, LiFePO$_4$ or the like) can be used as the positive electrode active material contained in the positive electrode active material layer 54. The positive electrode active material layer 54 can contain components other than the active material, such as an electrically conductive material or a binder. Carbon black such as acetylene black (AB) or other carbon materials (for example, graphite or the like) can be advantageously used as the electrically conductive material. For example, poly(vinylidene fluoride) (PVDF) or the like can be used as the binder.

For example, a copper foil or the like can be used as the negative electrode current collector 62 that constitutes the negative electrode sheet 60. For example, a carbon material such as graphite, hard carbon or soft carbon can be used as the negative electrode active material contained in the negative electrode active material layer 64. The negative electrode active material layer 64 can contain components other than the active material, such as a binder or a thickening agent. For example, a styrene-butadiene rubber (SBR) or the like can be used as the binder. For example, carboxymethyl cellulose (CMC) or the like can be used as the thickening agent.

Examples of the separator 70 include porous sheets (films) made of resins such as polyethylene (PE), polypropylene (PP), polyesters, cellulose and polyamides. This type of porous sheet may have a single layer structure or a laminated structure having two or more layers (for example, a three layer structure obtained by laminating a PP layer on both surfaces of a PE layer). A heat-resistant layer (HRL) may be provided on a surface of the separator 70.

The electrolyte solution for a lithium secondary battery according to the present embodiment mentioned above can be used as the electrolyte solution 80. It should be noted that FIG. 1 does not accurately show the amount of electrolyte solution 80 injected into the battery case 30.

The lithium secondary battery 100 constituted in the manner described above can be used in a variety of applications. Examples of desired applications include driving power sources installed on vehicles such as electric vehicles (EV), hybrid vehicles (HV) and plug in hybrid vehicles (PHV). The lithium secondary battery 100 can typically also be used in the form of a battery pack in which a plurality of batteries are connected in series and/or in parallel.

As one example, an explanation will be given of a square lithium secondary battery 100 provided with a flat wound electrode body 20. However, the lithium secondary battery can also be constituted as a lithium secondary battery having a stacked electrode body. In addition, the lithium secondary battery can also be constituted as a cylindrical lithium secondary battery.

Explanations will now be given of working examples relating to the present teaching, but the present teaching is not intended to be limited to these working examples.

Production of Lithium Secondary Battery for Evaluation

Battery No. 1

A positive electrode active material layer-forming slurry was prepared by mixing LiNi$_{1/3}$Co$_{1/3}$Mn$_{1/3}$O$_2$(LNCM) as a positive electrode active material powder, acetylene black (AB) as an electrically conductive material and poly(vinylidene fluoride) (PVdF) as a binder with N-methylpyrrolidone (NMP) at a mass ratio of LNCM:AB:PVdF=87:10:3. A positive electrode sheet was produced by coating this slurry in a band-like manner on both surfaces of a long strip-shaped aluminum foil, drying, and then roll-pressing until the density of the positive electrode active material layer reached 2.3 g/cm$^3$.

Natural graphite having an average particle diameter (D50) of 10 μm, a specific surface area of 4.8 m$^2$/g, a C$_0$ value of 0.67 nm and an L$_c$ value of 27 nm was prepared as a negative electrode active material. A negative electrode active material layer-forming slurry was prepared by mixing this natural graphite (C), a styrene butadiene rubber (SBR) as a binder and carboxymethyl cellulose (CMC) as a thickening agent with ion exchanged water at a mass ratio of C:SBR:CMC=98:1:1. A negative electrode sheet was produced by coating this slurry in a band-like manner on both surfaces of a long strip-shaped copper foil, drying, and then roll-pressing.

In addition, two separator sheets (porous polyolefin sheets) were prepared.

An electrode body was produced by disposing the thus produced positive electrode sheet and negative electrode sheet so as to face each other, with the separator sheets interposed therebetween.

Current collectors were attached to the thus produced electrode body, which was then housed in a laminated case together with an electrolyte solution, and the laminated case was then sealed. Electrolyte solutions obtained by dissolving the salts and additives shown in Table 1 at the concentrations shown in Table 1 in solvents having the types and compositions shown in Table 1 were used as electrolyte solutions.

Lithium secondary batteries A1 to A7 and B1 to B5 were produced in this way.

Conditioning

Each produced lithium secondary battery was placed in an environment at a temperature of 25° C. Each lithium secondary battery was conditioned by being charged at a constant current of ⅓ C to a voltage of 4.1 V, allowed to rest for 10 minutes, discharged at a constant current of ⅓ C to a voltage of 3.0 V, and then allowed to rest for 10 minutes.

Measurement of Initial Battery Resistance

Each conditioned lithium secondary battery was adjusted to a state of charge (SOC) of 60%. Each conditioned battery was placed in an environment at a temperature of 25° C. or −10° C. and discharged for 10 seconds. The discharging current rate was 1 C, 3 C, 5 C and 10 C, and the voltage was measured after discharging at these current rates. IV resistance was calculated from the current rate and the voltage, and the average value thereof was taken to be the battery resistance. Ratios of resistance values for other batteries were calculated, with the resistance of lithium secondary battery B1 being taken as 1.00. The results are shown in Table 1.

Evaluation of Charging and Discharging Cycle Characteristics

Each conditioned lithium secondary battery was placed in an environment at a temperature of 25° C. This was achieved by subjecting a battery to constant current-constant voltage charging at a current of ⅓ C to a voltage of 4.1 V (cut current: 1/50 C), allowing the battery to rest for 10 minutes, and then subjecting the battery to constant current discharging at a current of ⅓ C to a voltage of 3.0 V. The discharge capacity was measured at this point, and this was taken to be the initial capacity.

Each produced lithium secondary battery was then placed in an environment at 60° C. A cycle formed of constant current charging at a current of 2 C to a voltage of 4.1 V and then constant current discharging at a current of 2 C to a voltage of 3.0 V was repeated 200) times. The discharge capacity was then measured using the same method as that described above, and the discharge capacity at this point was determined as the battery capacity following 200 charging and discharging cycles. The capacity retention rate (%) was determined as (battery capacity following 200 charging and discharging cycles/initial capacity)×100. The results are shown in Table 1.

TABLE 1

| Battery No. | Salt Type | Concentration (mol/L) | Solvent Type | Compositional ratio (vol %) | Additive Type | Added amount (mass %) | Resistance 25° C. | Resistance −10° C. | Cycle characteristics Capacity retention rate (%) |
|---|---|---|---|---|---|---|---|---|---|
| B1 | LiPF$_6$/LiFSI | 0.75/0.75 | MDFA | 100 | MA | 1 | 1.00 | 1.00 | 76 |
| B2 | LiPF$_6$ | 1.5 | MDFA | 100 | MA | 1 | 1.83 | 3.64 | 73 |
| B3 | LiFSI | 1.5 | MDFA | 100 | VC | 1 | 0.98 | 0.99 | 85 |
| B4 | LiPF$_6$ | 1.0 | EC/DMC/EMC | 30/40/30 | VC | 1 | 1.16 | 0.99 | 85 |
| A1 | LiFSI | 1.0 | MDFA | 100 | MA | 1 | 0.91 | 0.92 | 91 |
| A2 | LiFSI | 1.5 | MDFA | 100 | MA | 1 | 0.78 | 0.65 | 92 |
| A3 | LiFSI | 2.0 | MDFA | 100 | MA | 1 | 0.67 | 0.42 | 91 |
| A4 | LiFSI | 2.5 | MDFA | 100 | MA | 1 | 0.66 | 0.45 | 91 |
| B5 | LiFSI | 1.5 | MDFA | 100 | — | — | 0.94 | 0.94 | 85 |
| A5 | LiFSI | 1.5 | MDFA | 100 | MA | 0.01 | 0.82 | 0.74 | 88 |
| A6 | LiFSI | 1.5 | MDFA | 100 | MA | 5 | 0.94 | 0.94 | 92 |
| A7 | LiFSI | 1.5 | EC/MDFA | 30/70 | MA | 1 | 0.70 | 0.89 | 92 |

LiPF$_6$: Lithium hexafluorophosphate
LiFSI: Lithium bis(fluorosulfonyl)imide
MDFA: Methyl difluoroacetate
EC: Ethylene carbonate
DMC: Dimethyl carbonate
EMC: Ethyl methyl carbonate
MA: Maleic anhydride
VC: Vinylene carbonate Lithium secondary batteries A1 to A4, which contained only LiFSI as an electrolyte salt, had lower resistance values and higher capacity retention rates than lithium secondary batteries B1 and B2, which contained LiPF$_6$ as an electrolyte salt. This is thought to be because side reactions between MDFA and LiPF$_6$ did not occur due to absence of LiPF$_6$ in electrolyte solution and also because decomposition of MDFA was suppressed due to formation of a coating film by LiFSI.

In addition, a higher concentration of electrolyte salt led to lower resistance up to a concentration of 2.0 mol/L. This is thought to be because the number of Li carriers increases and electrical conductivity increases as the electrolyte salt concentration increases. From the perspective of low resistance, it can be said that a particularly desired electrolyte salt concentration range is no less than 1.5 mol/L and no more than 2.5 mol/L.

Lithium secondary battery B3, which contained VC as an additive, had a higher resistance and a lower capacity retention rate than lithium secondary battery A2, which contained MA. This is thought to be because reductive decomposition potentials are in the order MA>MDFA>VC, meaning that MA, which forms a coating film by being decomposed at a higher potential than the solvent, exhibits a higher effect as an additive. In addition, this is also thought to be because MA and VC differ in terms of ease of forming a mixed coating film with LiFSI as well as the quality of such a mixed coating film.

An electrolyte solution that was commonplace in the prior art (which contained carbonate-based solvents, $LiPF_6$ and VC) was used in lithium secondary battery B4. Lithium secondary batteries A1 to A7 had lower resistance values and higher capacity retention rates than this lithium secondary battery B4.

Lithium secondary battery B5, which did not contain an additive, exhibited a better resistance lowering effect than lithium secondary battery B1, but exhibited a lower resistance lowering effect and a lower capacity retention rate than lithium secondary battery A2, which contained MA. This is thought to be because a mixed coating film of MA and LiFSI can suppress reductive decomposition of MDFA better than a coating film of LiFSI.

Lithium secondary battery A5, which contained 0.01 mass % of an additive, and lithium secondary battery A6, which contained 5 mass % of an additive, exhibited a better resistance lowering effect and capacity retention rate improving effect than lithium secondary battery B1. However, the resistance lowering effect was highest in lithium secondary battery A2, which contained 1 mass % of an additive. This is thought to be because the MDFA decomposition suppression effect decreases as the amount of additive decreases and because the coating film formed by the additive becomes thicker and the resistance increases if the amount of additive is high.

30 vol % of EC was added to the solvent in lithium secondary battery A7, but it was confirmed that this battery exhibited a better resistance lowering effect and capacity retention rate improving effect than lithium secondary battery B1.

Lithium secondary batteries A1 to A7 are lithium secondary batteries obtained using electrolyte solutions that correspond to the electrolyte solution for a lithium secondary battery according to the present embodiment. Therefore, it can be understood that by using the electrolyte solution for a lithium secondary battery according to the present embodiment in a lithium secondary battery, it is possible to lower the resistance and increase the cycle characteristics of the lithium secondary battery.

Specific examples of the present teaching have been explained in detail above, but these are merely examples, and do not limit the scope of the teaching. The features disclosed in the claims also encompass modes obtained by variously modifying or altering the specific examples shown above.

What is claimed is:

1. An electrolyte solution for a lithium secondary battery, comprising:
    an electrolyte salt consisting essentially of a lithium imide salt;
    a solvent containing methyl difluoroacetate; and
    an unsaturated carboxylic acid anhydride compound represented by formula (1) below as an additive:

[C1]

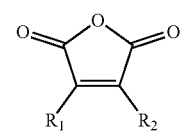

(1)

in the formula, $R_1$ and $R_2$ each independently denote a hydrogen atom, a fluorine atom, or an alkyl group that may be fluorine-substituted, or $R_1$ and $R_2$ bond to each other to form a ring structure.

2. The electrolyte solution for a lithium secondary battery according to claim 1, wherein the electrolyte salt has a concentration of no less than 1.5 mol/L and no more than 2.5 mol/L.

* * * * *